United States Patent [19]

Pauze et al.

[11] 4,429,073

[45] Jan. 31, 1984

[54] POLYETHERIMIDE COMPOSITIONS AND PROCESSES FOR PRODUCTION

[75] Inventors: Denis R. Pauze, Scotia; Raymond B. Hughes, Schenectady, both of N.Y.

[73] Assignee: General Electric Company, Schenectady, N.Y.

[21] Appl. No.: 394,095

[22] Filed: Jul. 1, 1982

Related U.S. Application Data

[62] Division of Ser. No. 190,030, Sep. 23, 1980, abandoned.

[51] Int. Cl.³ .................. C08G 73/10; C08L 79/08
[52] U.S. Cl. .................................. 524/600; 525/420; 525/424; 525/436; 528/185; 528/481; 528/492; 528/499; 528/502
[58] Field of Search ................. 524/600; 525/424, 436, 525/420; 528/185, 481, 502, 492, 499

[56] References Cited

U.S. PATENT DOCUMENTS

| | | |
|---|---|---|
| 2,936,296 | 5/1960 | Precopio et al. |
| 3,297,785 | 1/1967 | George et al. |
| 3,541,038 | 11/1970 | Nakano et al. |
| 3,555,113 | 1/1971 | Sattler. |
| 3,847,867 | 11/1974 | Heath et al. |
| 3,865,785 | 2/1975 | Pauze ................... 528/289 |
| 3,922,252 | 11/1975 | Holub et al. ........... 528/289 |
| 4,259,221 | 3/1981 | Pauze ................... 525/424 |

*Primary Examiner*—Lester L. Lee
*Attorney, Agent, or Firm*—Donald J. Voss

[57] ABSTRACT

Improved polyetherimide compositions and processes for their production are described. Various polyetherimide derivatives including water-soluble and tri-functionalisocyanate cross-linked resins are described. They permit production of water-based enamels and coatable particulates which may be employed in, for example, formulation of insulated electrical conductors.

6 Claims, 1 Drawing Figure

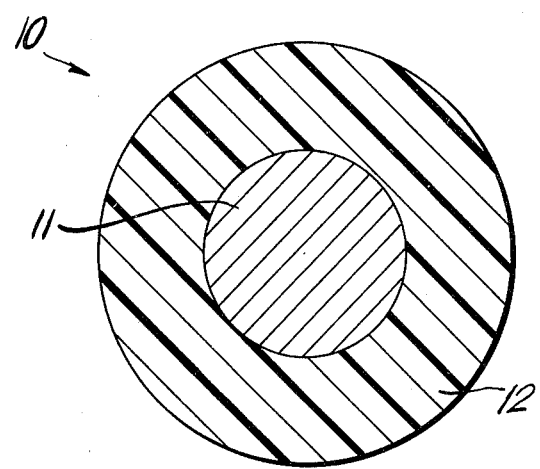

POLYETHERIMIDE COMPOSITIONS AND PROCESSES FOR PRODUCTION

This is a division of application Ser. No. 190,030, filed Sept. 23, 1980, and now abandoned.

BACKGROUND OF THE INVENTION

Polyetherimide resins such as those described in U.S. Pat. No. 3,847,867 have become increasingly important. These resins may be produced in known manner by reaction between aromatic bis(ether anhydrides) and organic diamines. They, and various derivatives, possess highly desirable physical and electrical properties.

One of the most important classes of derivatives involves resins produced in part from polyisocyanate compounds. In these resins, the polyisocyanate compounds may be employed in forming either or both of the polymer backbone and side chains. Most commonly, they represent a cross-linking agent for the resins.

In U.S. Pat. No. 3,541,038, for example, high molecular weight polyimidamide resins are produced by condensation of tribasic acid anhydride with diisocyanate compounds. The resultant resins are especially useful for coil-impregnation or electrical insulation. Tough films can also be produced from solutions of them.

Such polyisocyanate compounds, preferably employed in blocked form, are also described in U.S. patent application Ser. No. 53,317, filed June 29, 1979, where they are reacted to cross-link various polyetherimides. The resultant products have a veriety of specialized uses in, for example, enamels for electrical insulation, laminate binders and high temperature paints. Many general and additional uses are also known or apparent.

While the foregoing resins are satisfactory for many uses, further improvements are desired. Better performance, new uses and additional application or production techniques would enable substantial advancement in their pertinent art or arts.

DESCRIPTION OF THE INVENTION

This invention involves improved polyetherimide resins and processes for their production.

According to one embodiment of this invention, there are provided water-soluble polyetherimide resins. Such resins are derived by cleavage of polyetherimide polymer in the presence of amine.

Suitable polymer from which these water-soluble resins are produced may be obtained commercially or produced by conventional means. For example, the polyetherimide polymer may be produced by reaction of aromatic bis(ether anhydride) with organic diamine as described in the previously mentioned U.S. Pat. No. 3,849,867. A preferred aromatic bis(ether anhydride), for example, is 2,2 bis [4-(3,4-dicarboxyphenoxy)-phenyl]—propane dianhydride; preferred diamines are aromatic diamines, such as phenylene diamine.

Cleavage is preformed by combination of the polymer with water in the presence of an amine. The resultant reaction is permitted to proceed at, for example, ambient temperature until the desired water solubility is achieved.

For cleavage, at least 25 and preferably from 15 to 35% amine by weight of polyetherimide polymer is employed and at least 25% and preferably from 50 to 90% water by weight of polymer.

The resultant cleaved or water-soluble polyetherimide resins are of particular importance in that they allow production of water-based enamels. Such enamels may be substituted for other, and particularly organic solvent-based, enamels. Thus they may be employed for such applications as electrical insulation or wires or other conductors.

The aqueous compositions of cleaved polymer most preferably will contain 20 to 70% by weight of resin solids.

In addition to other normal enamel components which may be present, these water-based enamels may contain organic and water-miscible solvent. Such organic solvent can assist in solubilization of the resin and/or other enamel components.

Any desired degree of water in the enamel is readily achieved. Commonly, for example, the polymer is cleaved in a low boiling organic solvent which is immiscible in water. After achieving the desired degree of cleavage, the organic solvent may be selectively removed from the higher boiling water by vacuum distillation. Other conventional techniques of solvent removal such as liquid/liquid extraction or the like may, however, also be utilized to accomplish or obtain transfer of the cleaved polymer to a more aqueous solvent solution.

For use, the enamel, preferably after the addition of a trifunctional isocyanate agent, is simply applied to the conductor to be insulated, dried and then heat-cured. This results in production of a solid, insulating wall of the polyetherimide resin about the conductor.

In accordance with another embodiment of this invention, similar insulation is formed by electrostatically coating a conductor with solid resin particulates and then melt-curing the particulates into a solid wall.

These resin particulates may be formed from polyetherimide resins such as those described above. Preferably, however, the resin employed is polyetherimide polymer which has been cross-linked with tri-functional isocyanate agent. There is no criticality as to this agent and one of the commercially available agents mentioned below is most conveniently employed. Preferably from 1 to 40, and more preferably from 5 to 20 parts of isocyanate agent per 100 parts by weight of polyetherimide resin will be used.

To facilitate the cross-linking reaction, it is preferred to utilize blocked agent. Such blocked polyisocyanates are well known in the polyester art. The term "blocked" means that the polyisocyanate has been reacted with a group that will split off at the temperature employed with the polymeric etherimide. As polyisocyanate components there may be mentioned the cyclic trimer of 2,4-tolylene diisocyanate; mixtures of the cyclic tricyanate; 4,4'-diphenyl 2,4,6-triisocyanato toluene, and the like.

Typical compounds which can be used to block the isocyanate groupings, e.g., are phenol; meta-cresol; paracresol; ortho cresol and mixtures thereof; the xylenols, e.g., 2,6-dimethylphenol; 4-ethyl phenol, 4-t-butyl-phenol; 2-butylphenol; 4-n-octyphenol; 4-isoctylphenol, etc.; monohydric alcohols, such as methyl alcohol; ethyl alcohol, n-propyl alcohol, and the like, acetoacetic ester, hydroxyalkylcarbamic acid aryl esters, e.g., hydroxyethylcarbamic acid phenylester, mercaptans, e.g., 2-mercaptobenzothiazole, methyl mercaptans, and the like.

Others include the cyclic trimer of 2,4-tolylene diisocyanate having the isocyanate groups blocked with tertiary butylalcohol or tertiary amyl alcohol or dimethyl ethinyl carbinol or acetoacetic acid ester or phenol or cresylic acid or ε—caprolactam or 2-mercaptobenzothiazole, or succinimide or phthalimide or diphenyl amine or phenyl—β-naphthylamine, triphenyl methane triisocyanate having the isocyanate groups blocked with phenol or mixed cresols or tertiary butyl alcohol or phthalalimide, 1,3,3-pentanetriisocyanate having the isocyanate groups blocked with m-cresol, etc.

As specific examples of such blocked isocyanates there may also be mentioned Mondur S, wherein the isocyanate groups of the reaction product of 3 moles of mixed 2,4- and 2,6-tolylene diisocyanate with trimethylol propane are blocked be esterification with phenol and Mondur SH, wherein the mixed cyclic trimers of 2,4- and 2,6-tolylene diisocyanates have the three free isocyanate groups blocked by esterification with phenol. At present Mondour SH is the preferred blocked polyisocyanate.

Cross-linking will proceed in conventional manner. Normally, however, elevated temperatures are utilized (particularly with blocked agent) to expedite this reaction. Thus, temperatures of at least about 50° C., more desirably from 150° to 250° C., for a period of 1 to 5 hours are preferred. Under these conditions, not only cross-linking, but also removal of the resin dispersant, may be achieved.

Particulate formation is accomplished by drying a solution of the polyetherimide and then grinding the resulting solid(s) to the desired size under temperature conditions below its softening point.

The drying step of, for example, a methylene chloride solution may be accomplished in any known manner. Generally, however, it is performed at subatmospheric pressure, and desirably at below the melting point of the polymer. Spray drying techniques are particularly effective. They meet these objectives and produce a grandular product. Similarly, the solution may conveniently be freeze-dried. Both these latter techniques have the further advantage of yielding solid product suitable to facilitate the subsequent grinding step.

Grinding of the dried polymer must occur at a temperature below that at which the polymer melts or softens. Otherwise, the ground polymer will agglomerate. However, because the grinding operation itself may product heat, the polymer is normally maintained under cryogenic conditions. A good grinding temperature of most cases is below 0° C.

In the grinding step, the solid polymer is ordinarily reduced to particulates of mesh size below 300, preferably of from about 200 to 270 mesh. This provides optimum particulates with which to coat a conductor.

To provide insulation for the conductor, these particulates are first electrostatically coated onto the conductor. Generally, a coating having a thickness of about 1 mil, preferably from 2 to 5 mils is utilized. The coated conductor may then be heated to at least the softening, and preferably the melting, point of the polymer. This allows the polymer particulates to coalesce and flow into a solid insulating wall about the conductor.

BRIEF DESCRIPTION OF THE DRAWING

The FIGURE shows a cross-sectional view of an insulated conductor of the present invention.

DESCRIPTION OF PREFERRED EMBODIMENTS AND EXAMPLES

In the figure, a magnet wire 10, has a conductor 11 (normally metallic) covered peripherally with an insulating wall layer 12 of tri-functional isocyanate cross-linked polyetherimide polymer. Although the figure illustrates a conductor wire which is circular in cross-section, it will be understood that square, rectangularly or other shaped conductors in, for example the form of flat stripes or foils may also be used without departing from the scope of this invention.

The wires are visually inspected for smoothness in the usual manner, and tested for flexural strength at 25 percent elongation, for heat shock at 260° C. after having been stretched 20 percent, for burnout which is an indication of resistance to high temperature in the winding of a stalled motor, for abrasion scrape and for repeat scrape which is important to resist stresses in high speed winding machines, and the like. Such tests are well known in the art and are described, for example, in U.S. Pat. Nos. 2,936,296, 3,297,785, 3,555,113, and 3,865,785. Specifically, the flexibility is determined by stretching the control electrical conductor 25 percent of its original length and winding it about a stepped mandrel having diameters of one, two and three times the wire diameter, the smallest mandrel diameter at which failure does not occur being taken as the test point (GE Method E 18B4). Heat shock is measured by prestretching wire samples to elongation of 20 percent and winding the wire so stretched on a conical mandrel having a diameter ranging from 0.7 to 10 times the diameter of the bare wire and having an apex angle of about 20°, removing the conical shaped coil of wire from the mandrel and placing it in an air circulating oven at the indicated temperature for ½ hour and taking the arithmetical average of five coils measured at the largest diameter at which cracking appears, this diameter being exposed as the inside of the coil divided by the diameter of the wire (GE Method E 18H3). For cut through, two coated wires are placed horizontally and at right angles to each other in a suitable jig with a 2000 g weight centered on the wires at the cross-over point. The temperature of the assembly is raised at a constant rate of 5 degrees C per minute until the two conductors come in contact tieh each other which is detected by electrical circuitry. The temperature at which this short circuiting occurs is considered the cut through temperature (NEMA Method 50.1.1). Abrasion single, also known as unilateral scrape uses a constant load on 9 mil diameter piano wire, which is at right angles to the coated wire, moving along the length of the wire into an increasing lever arm until the insulation is removed and the needle makes contact with the conductor. The distance the weighted head travels, multiplied by the weight gives a numerical value for scrape resistance. Repeated scrape abrasion resistance is done with a cylindrical surface of a 16 mil diameter #11 needle which is moved back and forth a distance of 3/8 inch at a right angle to the wire under a load of 700 g. The number of cycles required to cause the needle to break through the film is the repeat scrape value. Burnout is carried out by standard methods and the value is expressed as the official figure of merit (OFM) (NEMA Method 58.1.1). Solvent resistance is also carried out by standard procedures (NEMA Method 51.1.1.)

EXAMPLE 1

A suitable polyetherimide polymer for wall or layer 12 may be made from the following:

PART I

| Ingredients | Amounts |
| --- | --- |
| 2,2 bis [4-(3,4-dicarboxyphenoxy) phenyl] - propane dianhydride | 1 mole |
| m-phenylenediamine | 1 mole |
| Solvent | |
| { Ortho-dichlorobenzene - 50 parts<br>Toluene - 50 parts | to make 20% solution |

The mixture of ingredients is stirred and heated to reflux for 5 hours under a nitrogen atmosphere. In the course of reaction, water forms and is removed by azeotropic distillation. Upon cooling, the reaction mixture is poured into methanol to isolate solid polymer as a precipitate.

The polymer is then combined as follows:

PART II

| Ingredients | Parts by Weight |
| --- | --- |
| Polymer | 902.1 |
| Phenol end-blocked trimerized toluene diisocyanate (Mondur SH) | 90.2 |
| Dibutyl Tin Dilaurate | 7.6 |
| Solvent Methylene Chloride | 10,000.0 |

The resultant solution is then spray-dried and cryogenically ground at below 0° C. to a particle size of about 270 mesh. These particles are then electrostatically coated onto conductor 11 and then heat-cured in place to produce an insulated magnet wire 10.

EXAMPLE 2

Isolated polymer produced in accordance with Part I of Example 1 is combined as follows:

| Ingredients | Parts by Weight |
| --- | --- |
| Polymer | 400 |
| Dimethyl ethanol amine | 100 |
| Water | 100 |
| Solvent N—methyl pyrrolidine | 1,000 |

The resultant solution is maintained under agitation at ambient temperature for about 4 hours until the desired degree of cleavage of polyetherimide is achieved. To this solution is added 354 parts of water to produce a water-based enamel. This enamel is applied onto a metallic conductor in 6 passes using a 15-foot gas fired down-draft oven. There results a magnet wire such as that shown in the figure and previously described.

EXAMPLE 3

Isolated polymer produced in accordance with Part I of Example 1 is combined as follows:

| Ingredients | Parts by Weight |
| --- | --- |
| Polymer | 800 |
| N—methylpyrrolidone | 1147 |
| Dimethyl ethanolamine | 200 |
| Water | 100 |

The mixture is stirred and heated to 130° C. for approximately 4 hours until all the polymer is in solution. Then, at 90° C., 420 parts of water is slowly added. The viscosity at 25° C. is 570 centipoise; solids content 33.4%.

To 1000 parts of the above solution is added 81 parts of a 60% non-volatiles (N.V.) content solution of a phenol end-blocked trimerized toluenediisocyanate (Mondur SH) and 2.6 parts of dibutyltin dilaurate. A clear solution suitable for use as an enamel in this invention is obtained.

The foregoing enamel is applied to #18 awg copper wire in a 15′ gas-fired down-draft tower into seven passes at a temperature range between 290° and 490° C. The wire test results are as follows:

| | Coating speed (feet/minute) | |
| --- | --- | --- |
| | 40 | 50 |
| Build (coating thickness, mils) | 3.0 | 3.0 |
| Solvent resistance 50/50, 10 min. | OK | OK |
| Flexibility 25%+ | 1× | 1× |
| Cut through, 2000 g., °C. | 341 | 371 |
| Heat Shock, 20% - 30′ - 260° C. | 1× | 2× |
| Burnout, OFM | 11.5 | 10.7 |
| Abrasion-single | 1600 | 1800 |
| Repeat scrape | 62 | 78 |

EXAMPLES 3-5

Wire enamels are prepared from the following:

| Ingredients | Parts by Weight |
| --- | --- |
| Polyimide polymer as in Example 1, Part I | 80 |
| N—methylpyrrolidone | 1620 |
| Dimethyl ethanolamine | 150 |

The N-methylpyrrolidone and dimethylethanolamine are added to a flask and heated with stirring to 125° C. The polyimide is slowly added and stirring is continued. The temperature is raised to 130° C. and held for 6 hours. The mixture is then cooled to 100° C. and 764 g of water is added. The viscosity at 25° C. is 277 cs; the solids content is 27% at 200° C.

The solution as prepared is suitable for use as a wire enamel (Example 3) according to this invention. Two additional embodiments are prepared: to 800 g of Example 3 enamel is added 81 g of KL5-7005 alkanol blocked isocyanate (40% solution, Mobay Company and the enamel is designated Example 4; and to 800 g of Example 3 enamel is added 40 g of phenol blocked trimerized toluenediisocyanate (Mondur SH) and the enamel is deisgnated Example 5.

The foregoing enamels are applied to #18 awg copper wire in a 15′ gas-fired down-draft tower with seven passes at a temperature range between 290° and 490° C. The wire test results are as follows:

| | Example | | |
| --- | --- | --- | --- |
| | 3 | 4 | 5 |
| Coating speed (feet/min.) | 30 | 30 | 30 |

-continued

| | Example | | |
|---|---|---|---|
| | 3 | 4 | 5 |
| Build (coating thickness, mils) | 3.0 | 2.9 | 3.2 |
| Solvent resistance 50/50 10 min. | OK | OK | OK |
| Flexibility 25%+ | 2× | 2× | 2× |
| Cut through, 2000 g, °C. | 298 | 368 | 405 |
| Heat shock, 20% - 260° - 30' | 2× | 2× | 2× |
| Burnout, OFM | 8.5 | 12.9 | 12.5 |
| Abrasion - single | 1200 | 1300 | 1200 |
| Repeat scrape | 38 | 43 | 20 |

The foregoing results show that high quality coated magnet wires can be produced following the teachings of the present disclosure.

To more completely describe the present invention, the disclosures of the various applications and patents mentioned above are incorporated herein by reference. Obviously, many modifications and variations of the present invention are possible in the light of the above and other well-known teachings. It is therefore to be understood that changes may be made in the particularly described embodiments of this invention. All are within the full intended scope of the invention as defined in the appended claims.

We claim:

1. A process for preparing a water soluble coatable resin material comprising preparing a solution of polyetherimide polymer in a solvent therefor and mixing said solubilized polymer at ambient temperature with sufficient water to obtain the desired final viscosity in the presence of from about 15% to about 35% amine by weight of the polyetheramide solid resin material.

2. The process of claim 1, wherein the polymer is the reaction product of aromatic bis(ether anhydride) with organic diamine.

3. The water soluble resin material prepared by the process of claim 1.

4. The resin material of claim 3, wherein the polymer is the reaction product of aromatic bis(ether anhydride) with organic diamine.

5. The resin material of claim 3, wherein the solution additionally contains an organic solution of from about 1 to about 40 parts of a blocked trimerized diisocyanate per 100 parts of polyetherimide resin.

6. The resin material of claim 5 wherein the blocked trimerized diisocyanate is a phenol blocked trimerized toluenediisocyanate.

* * * * *